United States Patent [19]

Black et al.

[11] Patent Number: 4,731,870

[45] Date of Patent: Mar. 15, 1988

[54] PLATFORM TRANSMITTER TERMINAL (PTT) FOR USE WITH AN ARGOS TYPE SATELLITE SYSTEM AND UTILIZING A SOLAR ARRAY/RECHARGEABLE BATTERY POWER SOURCE

[75] Inventors: Harold D. Black, Highland; John Daniels, Baltimore, both of Md.; Nadav Levanon, Ramat-Gan, Israel; Thomas E. Strikwerda, Kensington, Md.

[73] Assignee: The Johns Hopkins University, Baltimore, Md.

[21] Appl. No.: 674,128

[22] Filed: Nov. 23, 1984

[51] Int. Cl.[4] .......................... H04B 1/04; H01Q 11/12
[52] U.S. Cl. .............................. 455/127; 455/12; 455/113; 455/117
[58] Field of Search ............... 455/127, 117, 113, 119, 455/12, 98, 100; 340/870.39, 870.28

[56] References Cited

U.S. PATENT DOCUMENTS

| | | | |
|---|---|---|---|
| 3,393,380 | 7/1968 | Webb | 455/113 |
| 4,274,132 | 6/1981 | Molyneux-Berry | 455/127 |
| 4,380,089 | 4/1983 | Weir | 455/127 |

FOREIGN PATENT DOCUMENTS

| | | | |
|---|---|---|---|
| 55-132098 | 4/1982 | Japan | 455/117 |
| 2136616 | 9/1984 | United Kingdom | 455/127 |

OTHER PUBLICATIONS

"Beacon Transmitters and Power Supply for Echo," McCubbin et al., Mar. 1961, pp. 147–161.
Aucouturier et al., Biotelemetry and Radiotracking of Wild Birds: Port. Device Using Solar Cells Power Supply, 10/77.

*Primary Examiner*—Robert L. Griffin
*Assistant Examiner*—Curtis Kuntz
*Attorney, Agent, or Firm*—Robert E. Archibald; Howard W. Califano

[57] ABSTRACT

An improved platform transmitter terminal (PTT) is disclosed for use in an ARGOS type satellite system. The PTT has reduced size, weight and extended life due to a solar array/rechargeable battery power source operating under the supervision of a unique power supply control and protection means. The invented PTT, when used in an ARGOS type system, opens the possibility of tracking, on a global basis, wild animals weighing as little as a few kilograms.

15 Claims, 6 Drawing Figures

T1 = 0.36 S     T3-T1 = 0.01 S
T3 = 0.37 S     T4-T3 = 5.12 S
T4 = 5.49 S     T0-T4 = 40.60 S
T0 = 46.09 S    T1/T0 = 1/128

PLATFORM TRANSMITTER TERMINAL (PTT) FOR USE WITH AN ARGOS TYPE SATELLITE SYSTEM AND UTILIZING A SOLAR ARRAY/RECHARGEABLE BATTERY POWER SOURCE

STATEMENT OF GOVERNMENTAL INTEREST

The government has rights in this invention pursuant to Contract No. N00024-83-C-5301 awarded by the Department of the Navy.

BACKGROUND AND/OR ENVIRONMENT OF THE INVENTION

1. Field of the Invention

The ARGOS system is a joint U.S./French space program utilizing orbiting satellite receivers and ground based beacons called platform transmitter terminals (PTTs). The ARGOS system provides data collection and platform location services on a global scale. The present invention is an improved ARGOS platform transmitter (PTT) that can be used with the ARGOS or similar systems and has reduced size, weight and extended life due to a solar array/rechargeable battery power source operating under the supervision of a unique power supply control and protection means. The invented ARGOS (PTT) increases the usefulness of the ARGOS system in tracking migratory birds, animals, buoys and balloons, etc. on a global basis. The invented PTT opens the possibility for tracking wild animals weighing as little as a few kilograms.

2. DESCRIPTION OF THE CONTEMPORARY AND/OR PRIOR ART

The ARGOS system utilizes the concept of Doppler frequency shift to calculate the position of transmitting beacons (platform transmitter terminals (PTTs)) on a global basis. A discussion of the principles of the ARGOS system is found in the following article, which is incorporated herein by reference: Bessin, J. L., "Operational Data Collection and Platform Location by Satellite", *Remote Sensing of the Environment*, Vol. 11, pp. 93-111, 1981. The ARGOS system is composed of three elements: (1) the user's sensors and transmitters (known as platform transmitter terminals or PTTs); (2) two satellites in orbit at any one time; and (3) a center, located in Toulouse, France, to process data and distribute results. A description of the ARGOS system can be found in the following guide, published by Service ARGOS, which is incorporated herein by reference: *ARGOS Users Guide*, Service ARGOS—Centre National D'Etudes Spatiales, Toulouse, France. Each PTT transmits at 401 MHz and sends a message, less than one second in duration, every 40 to 200 seconds, depending on the transmitter.

The two satellites currently in the Argos system are the NOAA-6 and NOAA-7, both in near-polar orbits at approximately 850 km altitude, periods of 102 minutes and spaced roughly 90° apart in longitude. With these characteristics one can expect 6-8 passes per day at the equator (each of these passes are long enough to locate the PTT). A maximum of 28 passes is possible in the polar regions since each satellite orbits fourteen times each day.

The basic principle of the Argos system is that the PTT can be located by measuring the Doppler shift of the PTT frequency during the satellite pass, typically 10-15 minutes duration. Distinguishing between various PTTs is done by encoding an identification number in the signal. Handling signals from many PTTs is possible since each PTT is "on" less than one second each minute and the arrival time of signals at the ARGOS receiver is random. In addition, up to four signals can be handled simultaneously provided they are shifted to different frequencies. Literally hundreds of PTTs can be handled worldwide.

Processing the data is performed by Service Argos in France, which computes the PTT location and will convert sensor data into engineering units. Current user fees are $20 per day per platform for location determination services. Each platform (PTT) is assigned a unique identification code by Service ARGOS. To date, nearly all PTTs have been located on balloons, buoys, icebergs, or ships.

To be utilized in migratory bird and animal tracking, and to be better utilized in buoys and balloon applications, the PTT must have: (1) a small volume and low weight, (2) sufficient power to be detected by a satellite and, (3) a long lifetime. These are conflicting goals which are difficult to satisfy, and have not been satisfied in the prior art. A large portion of the weight of any transmitter is the power supply. There are two choices for the power supply: use primary (non-rechargeable) batteries or secondary (rechargeable) batteries plus solar cells. Using primary cells that have sufficient energy to power an ARGOS PTT for a 200-day life time will seriously increase the transmitter's weight budget. The use of solar cells combined with rechargeable batteries reduces the transmitter's weight but produces an erratic and unstable power source because of vagaries of the weather and habits of birds or animals, if the PTT is used in migratory tracking. Such an unstable power supply would cause the PTT to frequently turn "off" and "on" with changes in available energy from the solar array/rechargeable battery power supply. This is undesirable since the PTT must transmit continuously for at least 2 hours to assure "visibility" by an ARGOS satellite. Since these problems had not been solved, prior art ARGOS PTT systems weigh approximately 2 Kilograms and are too heavy for many applications.

SUMMARY OF THE INVENTION

Applicants have invented a PTT, for use with an ARGOS type satellite system, which has a total weight of 150 grams; thereby broadening the scope of PTT applications to include migratory birds and animal tracking as well as high performance balloons and buoys for weather and oceanographic studies. To design a PTT having light weight and small volume, Applicants had to solve the above-referenced power supply problems.

Applicants have designed an ARGOS PTT that uses a solar array/rechargeable battery power source operating under the supervision of a unique power supply control and protection means. The power supply control and protection means mates the erratic, unstable power characteristics of the solar array rechargeable battery power source, with the PTT requirements for a stable power source that can power the transmitter for continuous periods lasting at least 2 hours.

The invented apparatus generally comprises: a rechargeable battery; a solar array; a transmitter means; and, a power supply control and protection means. The power supply control and protection means contains the following components parts: (1) a load control means, for assuring a sufficient continuous transmission to achieve PTT visibility from an ARGOS satellite, by operably actuating the transmitter means when the voltage level of the rechargeable battery reaches a threshold level (indicating sufficient charge in the rechargeable battery to power the system for at least two hours) and deactivating the power supply when the voltage level of the rechargeable battery falls to a lower threshold (indicating depletion of the battery to 2% of its charge capacity); and, (2) a charge rate control means, for protecting the rechargeable battery and assuring longer life, by switching a current limiting means in series with the solar array when the voltage level of the rechargeable battery reaches a level indicating full charge, and switching out the current limiting means when the voltage level of the rechargeable battery subsequently falls to a second lower threshold level. It will be noted that forcing current into a fully charged battery at a rate higher than one tenth of its ampere-load capacity will destroy battery cells and shorten battery life.

The load control means actuates a controller means which sequentially supplies power to component parts of the transmitter means during each 40-60 second transmission cycle. This feature efficiently conserves battery power. The controller means generally supplies power to a temperature controlled crystal oscillator (TCXO) first, allowing it to warm up and stabilize; second, power is supplied to a dividing phaselock loop (PLL) means, and lastly, power is supplied to the power amplifier, which is the largest power drain.

The invention also includes a unique protection circuit, which prevents the PTT from continuously transmitting for more than one minute in each 15-minute period. This feature is required before Service ARGOS will grant certification, and prevents a particular PTT from inadvertently staying in the "ON" position and masking out other PTTs in the vicinity. The invented protection circuit uniquely overcomes the need for a large and heavy RC circuit that is used in prior art devices to provide the 15-minute time constant. The invented protection circuit uses the rechargeable battery as the basis of the long time constant. This feature also allows the invented PTT to have a reduced volume and weight.

A first novel feature is the use of a power supply control and protection means which matches the erratic power characteristics of a solar array/rechargeable battery power source with the requirements for a stable power source capable of powering the transmitter for at least two continuous hours. This feature enables an ARGOS PTT to be designed which has reduced size and weight requirements.

A second novel feature is the use of a load control means which maintains the transmitter in a dormant state until the battery has obtained sufficient charge to power the transmitter continuously for two hours.

A third novel feature is the use of a controller means, operating under the supervision of the load control means, for sequentially powering the transmitter's components during each 40-60 seconds transmission cycle. This features reduces the energy requirements of the system thereby reducing the weight and size requirements of the power supply.

A fourth novel feature is the use of a charge rate control means which assures that the unstable and erratic power generated by the solar array will not destroy battery cells or shortened battery life. This feature enables the PTT powered by a solar array/rechargeable power source to have an extremely long lifetime.

A fifth novel feature is the use of a protection means which uses the rechargeable battery as the basis of a long time constant. This feature eliminates components that otherwise would require additional space and increase the weight of the PTT.

BRIEF DESCRIPTION OF THE DRAWINGS

In order that the present invention may be more fully understood, it is now described, by way of example, with reference to the accompanying drawings of which.

DESCRIPTION OF THE PREFERRED EMBODIMENT

Figure 1:
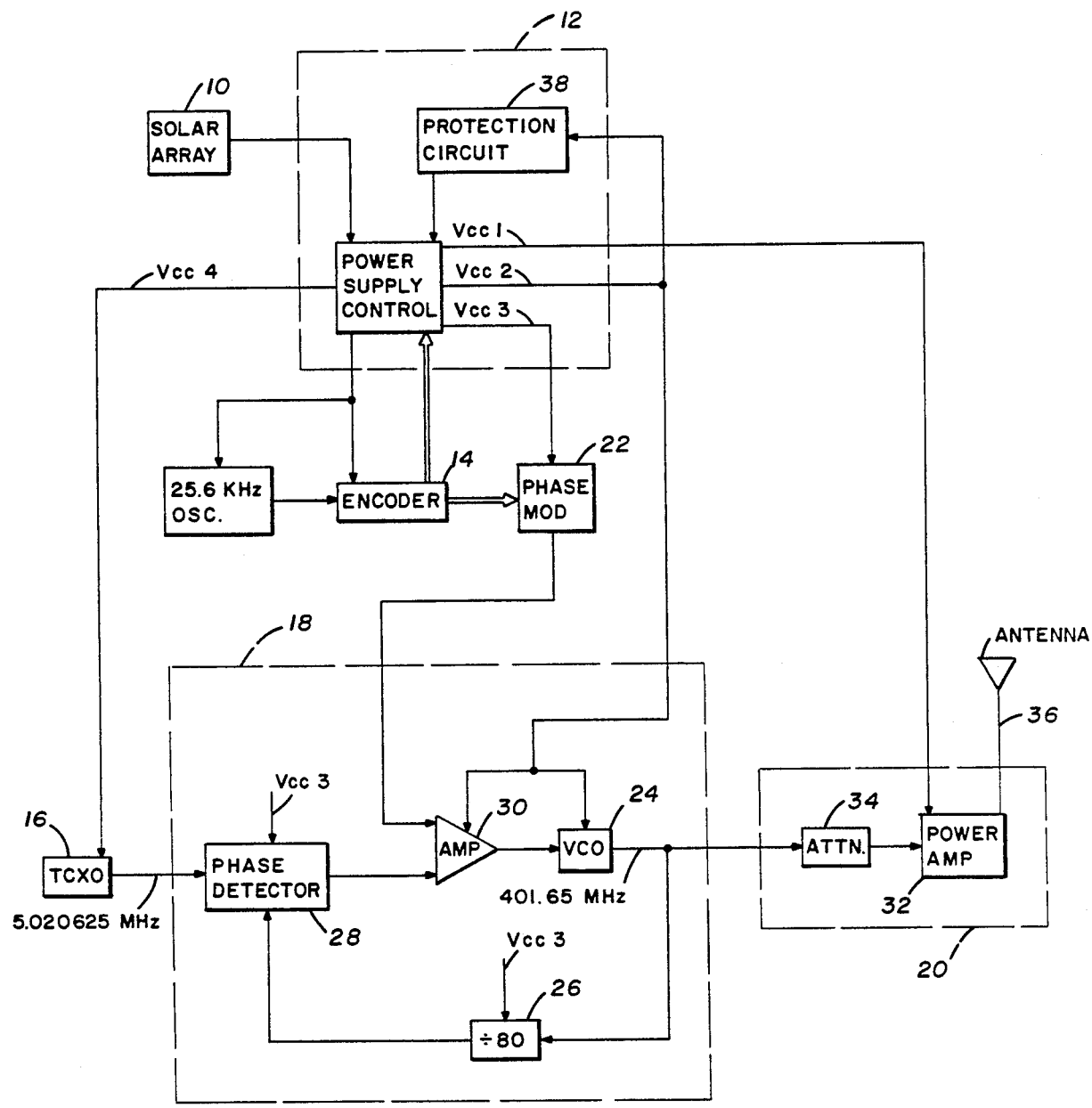
FIG. 1 is a block diagrammatic view of the invented ARGOS PTT using a solar array/rechargeable battery power source.

FIG. 1 is schematic block diagram of the invented ARGOS transmitter. The apparatus generally contains: a solar array 10; a power supply control and protection means 12 operably connected to an encoder 14; a transmitter means including a 5 MHz reference unit 16 that provides a stable 5.020625 MHz signal and a 400 MHz unit 18 operably connected to the 5 MHz reference unit 16 for generating the 401.65 MHz ARGOS signal; a power amplifier means 20 operably connected to the 400 MHz unit 18 to amplify the output signal to 1 watt; and, a phase modulator 22 controlled by encoder 14 and operably connected to the 400 MHz unit 18 to modulate the transmitted signal.

In the preferred embodiment, the 400 MHz unit 18 uses a dividing phase lock loop (PLL) to generate the 401.65 MHz ARGOS carrier frequency. The dividing phase lock loop (PLL) is phase locked to the 5.020625 MHz reference signal generated by the 5 MHz unit 16. (In the present embodiment, a temperature compensated crystal oscillator (TCXO) 16 is used to generate the 5.02065 MHz reference signal; however, other techniques such as placing the crystal oscillator in a temperature oven would also work, depending upon weight limitations of the unit.) The PLL circuitry includes a voltage control oscillator (VCO) 24 operating directly at the ARGOS carrier frequency of 401.65 MHz. The VCO 24 connects to a divide-by-80 circuit 26 and the resulting 5.020625 MHz signal its phase compared with the TCXO reference frequency 16 by phase detection circuit 28. The phase error signal produced by the phase detection circuit 28 is amplified and filtered in the loop amplifier 30 to generate the control voltage for the VCO 24.

The power amplifier means 20 includes a power amplifier 32 and an attenuator 34. The VCO 24 output level is about 50 milliwatts and is fed through the 3 dbattenuator 34 to the power amplifier 32. The Applicants have used a Motorola MHW-401-1 power amplifier, but other equivalent circuits could be used. The RF output is fed directly to a λ/4 antenna 36. (When the apparatus is used in the bird tracking environment, two ground plane wires are embedded in the bird harness to improve the antenna impedance stability.) Attenuator 34 is used to isolate the power amplifier from the VCO 24 and prevent any antenna impedance changes from effecting the VCO 24.

Phase modulation is introduced by switching offset voltages to the loop amplifier 30. Three different phase levels (0, +63°, −63°) are required by Service ARGOS. To obtain these three phase levels, the preferred embodiment uses three different voltage offset levels that are generated by the phase modulator 22 and fed into loop amplifier 30. The phase modulator 22 is functionally equivalent to an analog switch, in that one of the three voltage levels is selected and fed into loop amplifier 30.

Encoder 14 acts as the central controller of the transmitter, and performs the following functions: (1) generates a specific signal pattern which is fed to the phase modulator 22; and, (2) sequentially actuates various components within the transmitter for each 40 to 60 second transmission cycle.

For a fixed formatted message, the encoder 14 contains Manchester encoded information which is stored in a PROM and used to control the phase modulator 22 and thereby modulate the 400 MHz phase lock loop unit 18. When sensor data is being transmitted the encoder, or microprocessor, generates a binary signal containing sensor data information which is either converted into Manchester code by a phase modulator or by a microprocessor prior to being sent to the phase modulator. The transmission signal, as required by Service ARGOS, includes: a series of sync bits, a transmitter identification code, and sensor data information.

To conserve power, the encoder is used to sequentially actuate various components in the transmitter circuit. The encoder 14 controls the power supply to sequentially turn "ON" voltages Vcc1, Vcc2, Vcc3 and Vcc4. The five MHz reference signal generated by the TCXO 16, is actuated approximately 5 seconds before the transmission begins, to allow the TCXO to warm up and stabilize. The encoder accomplishes this by turning "ON" voltage Vcc4. The VCO 24, loop amplifier 30, and phase modulator 22, are actuated approximately 10 milliseconds prior to transmission by the encoder turning "ON" voltage Vcc2 and Vcc3. The power amplifier 32, which consumes the most power, is actuated last by turning "ON" voltage Vcc1. Sequencing the various transmitter components in this manner reduces power consumption and assures the solar cell/battery power source can be efficiently utilized. It will be noted, however, that time periods other than described above can be used in the power "ON" sequence to accomplish this same result.

The solar array 10 contains an array of highly efficiency solar cells. For a miniature transmitter, the present invention uses 24 cells, each 1 cm square and arranged in a 4 cm×6 cm array. When the solar array is pointed perpendicular to the full noon sun, approximately 30 milliamps can be produced. Energy from the solar array is used to drive the transmitter, and to charge small NiCd storage batteries. The energy produced by the solar array 10 is erratic and unstable due to weather conditions (clouds, rain), sun angle, orientation of the array relative to the sun position, etc.

The power supply control and protection means 12 must interface between erratic energy coming from the solar array 10, and a transmitter circuit which requires fixed voltages for undisturbed periods of transmission. It would be very undesirable for the transmitter system to frequently come "ON" and "OFF" with changes in available energy from the solar array 10. The system should only turn "ON" when sufficient charge is stored in the NiCd battery to provide transmission for an extended period of time. The inventors have found that the system should remain inactive until it has stored sufficient energy to transmit continuously for at least two hours. A two-hour continuous transmission would enable the ARGOS unit to be "visible" during one or two passes of the satellite. It will be noted, that under this power "ON" scenario, once the transmitter has been turned "ON" it will continuously transmit for a minimum of 2 hours, even if no additional energy is supplied to the solar array 10.

The system uses battery voltage to indicate the state of charge of the NiCd battery. The power supply control and protection means 12 senses the state of charge of the battery and provides: (1) a load control function and, (2) a charge rate control function. The power supply control circuit (discussed in detail later in this application and shown in detail in FIG. 2), constantly monitors battery voltage. This circuit draws little power (approximately 1 micro amp) is the only circuit which is operating at all times. In performing the load control function, the power supply control and protection means 12 senses when the battery voltage is at a level indicating that sufficient charge is stored in the batteries to operate the system for at least two hours. The power supply control and protection means 12 then actuates the transmitter system. When the power supply control and protection means 12 senses that the battery voltage, and correspondingly the battery charge, has dropped to a second lower threshold value, the transmitting system is turned "OFF". The power supply control and protection means 12 extends the life of the battery by turning "OFF" the transmitter load before the battery power is completely depleted. The inventors suggest that the transmitting system be turned "ON" when the battery is charged to 25-30% of its full capacity, and the turned "OFF" when the battery is charged to 2% of its full capacity.

In performing the charge rate control function, the power control and protection means 12, determines the point at which the battery is fully charged by sensing the battery voltage. Pumping current into a fully charged battery at a rate higher than 1/10 of its capacity will destroy battery cells and shorten battery life. The NiCd batteries selected by the inventors, have a 70 milliamps capacity and therefore should not be charged at a rate in excess of 7 milliamps once full charge has been reached. Since the transmitting system consumes 4 milliamps per hour, the current from the solar array should not exceed 11-12 milliamps per hour after the battery is fully charged. Once the power supply control circuit 12 senses that the battery is fully charged, by noting the battery voltage, circuit limiting diodes are switched in series with a solar array to limit the current to 12 milliamps. When the battery charge drops below a lower threshold, the limiting diodes are switched out of the circuit and the battery is charged at the higher current level.

In addition to providing a load control function, and a charge rate control function, the power supply control and protection means 12 also provides a protection function. Service ARGOS demands that if a transmitter transmits more than one second during the 40 to 60 second transmitting cycle, it must shut itself down for the remainder of the satellite's pass, e.g., the transmitter must turn off for at least 15 minutes. (Service ARGOS requires that the transmitter transmits for a maximum 920 milliseconds over each 40 to 60 second period.)

Providing a 15-minute delay requires a long time constant which necessitates the use of a large capacitor in an RC circuit. The present inventors overcome the space requirement of such a large capacitor by using the battery as the source of the long time constant. When the protection circuit 38 senses that the VCO 24 is powered for more than one second, the protection circuit turns "OFF" the encoder and hence all the supply voltages. It also causes the battery to drain at a high rate. Once the battery is discharged, the time required for the battery to again reach the level to turn the system "ON", is at least 15 minutes.

Figure 2:
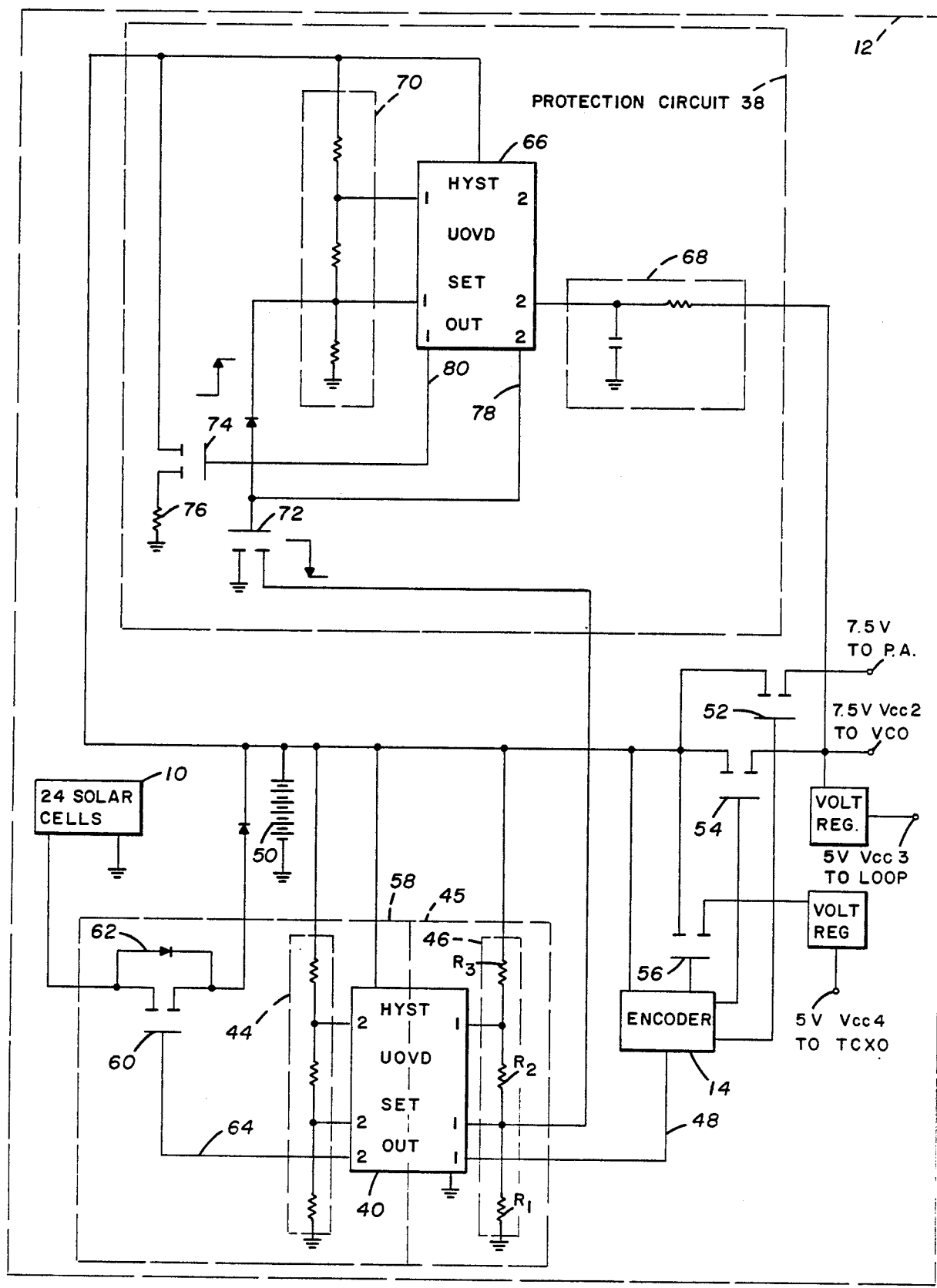
FIG. 2 is a schematic block diagram of the power supply control and protection means as taught by the present invention.

FIG. 2 is schematic diagram detailing the power supply control and protection means 12. A key component in the circuit is the Under Over Voltage Detector (UOVD) 40. The inventors in their preferred embodiment use an Intersil integrated circuit ICL 7665, but another functionally equivalent UOVD would work equally well. The UOVD 40 contains two almost identically units. Each unit is turned "ON" when the input voltage at its "SET" input rises above a very stable 1.3 volt reference. When the unit is turned "ON" its "HYST" output is shorted to the supply voltage. When a three resistor voltage divider, such as voltage divider 46, is used, the input to the "SET" input is related to the power supply voltage V, as $VR_1/(R_1+R_2+R_3)$ Once the unit is turned "ON", $R_3$ is shorted and the "SET" input is raised to $VR_1/(R_1+R_2)$. Thus, the UOVD switching voltage has decreased to a lower threshold. Battery voltage V must decrease to this second lower threshold before the reference of 1.3 volt at the "SET" input is crossed and the unit is turned "OFF".

A load control means 45 incorporated in the power supply control and protection means 12 includes: unit #1 of UOVD 40 and bridge resistors 46. The bridge resistors are connected to the "SET" and "HYST" ports such when the battery voltage V reaches a level in excess of 8 volts, output line 48 goes "HIGH" and turns "ON" encoder 14; when battery voltage V subsequently goes below 6.5 volts, output line 48 returns "LOW" and encoder 14 is deactivated. In the preferred embodiment, the encoder is turned "ON" when the battery is charged to 20–30% of its capacity, corresponding to a battery voltage of 8.2 volts, and turned "OFF" when the battery has depleted to 2% of its chargeable capacity, represented by battery voltage of 6.5 volts. For the NiCd batteries 50, selected in the preferred embodiment, the 20–30% charge capacity is associated with an 8.5 volt battery voltage and a 2% charge capacity is associated with a 6.5 volt battery voltage. Graph 52 on FIG. 3 contains a hysteresis graph showing the first threshold at which the encoder 14 is turned "ON" (8.2 volts) and the subsequent lower threshold where the encoder is turned "OFF" (6.5 volts).

Figure 4:
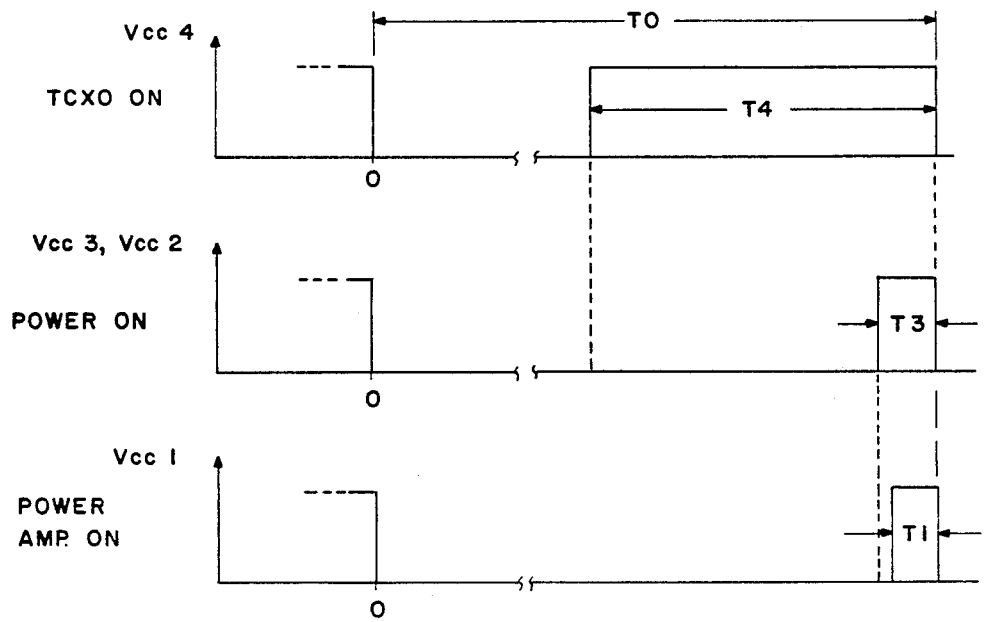
FIG. 4 is a timing diagram illustrating the power "on" sequence as taught by the present invention.

When encoder 14 is turned "ON" by the load control means, it switches power to various stages of the transmitter means in a sequential manner. The encoder 14 controls three HEXFET switches (52, 54, 56), which in turn control voltages Vcc1, Vcc2, Vcc3 and Vcc4. HEXFET 56 is turned "ON" first and provides voltage Vcc4 to the TCXO. Next HEXFET 54 is turned "ON" and provides voltages Vcc2 and Vcc3 to the loop amplifier and VCO. Finally, HEXFET 52 is turned "ON" by the encoder and supplies voltage Vcc1 to the power amplifier. After the power amplifier has been "ON" for the 300 to 900 millisecond transmission period, the encoder turns off the three HEXFET switches (52, 54, 56), thereby deactivating the TCXO, loop amplifier, VCO and power amplifier for approximately 40 seconds until the cycle is again repeated. The power "ON" sequence is best illustrated in the timing diagram showing FIG. 4. The timing diagram illustrates a 46.09 second transmission cycle. Approximately 40.60 seconds from the start of the cycle the encoder turns "ON" voltage Vcc4 and actuates the TCXO. The TCXO is energized for 5.49 seconds which is sufficient time to allow it to stabilize and produce a stable reference frequency. The VCO and loop amplifier are turned "ON" 5.12 seconds after the TCXO was turned "ON" and remains "ON" for 370 milliseconds. The power amplifier draws the largest current and is turned on 1 millisecond after the loop amplifier and remains on for 360 milliseconds. It is to be understood, that the power "ON" sequence may utilize timing intervals other than those described above.

Battery 50 loading occurs in pulses, the most significant being a 450 milliamp current pulse when the loop amplifier, the VCO and the power amplifier are turned "ON" (for 0.336 seconds every 46.09 seconds). Even if the battery is being charged, the drain during this pulse consumes current both from the solar array and the battery, and places the battery in a discharge mode. The battery voltage drop during this discharge pulse varies according to the charge state of the battery and whether the battery was being charged before the pulse. The minimum voltage drop is 0.25 volts and the maximum 0.8 volts. The maximum voltage drop occurs when the battery is almost depleted. When the battery voltage is 7.3 volts (before the pulse) a 450 milliamp current pulse will bring the voltage down 6.5 volts. For this reason the turn "OFF" voltage was chosen to be 6.5 volts. At that level the battery is almost depleted, but cell reversal has not yet occurred.

Returning to FIG. 2, the power supply control and protection means 12, also includes a charge rate control means 58, which is used to limit the charge rate once battery 50 is fully charged. As mentioned previously, fully charged small NiCd batteries should not be charged at a rate higher one tenth of their capacity, (for the battery selected in the preferred embodiment the charge rate is 7 milliamps). When the selected NiCd batteries reach a voltage level of 8.75 volts, the batteries are fully charged. The charge control means 58 includes: unit No. 2 of UOVD 40, bridge resistors 44, HEXFET switch 60, and current limiting means 62. When the battery voltage reaches 8.75 volts, output 64 of UOVD 40 turns "OFF" HEXFET switch 60. When HEXFET switch 60 is switched "OFF" the charging current from the solar array passes through the current limiting diode 62 which limits the current to 11–12 milliamps. (E.g., 7 milliamps maximum desirable charging current +4 milliamps transmitter power drain.) If the battery voltage subsequently falls to the lower hysteresis threshold of 8.2 volts, output 64 from UOVD 40 switches HEXFET 60 into the "ON" position. When HEXFET 60 is "ON" the current limiting diode 62 is shorted from the current path, and the battery is charged at the full current developed by the solar array 10.

Figure 3:
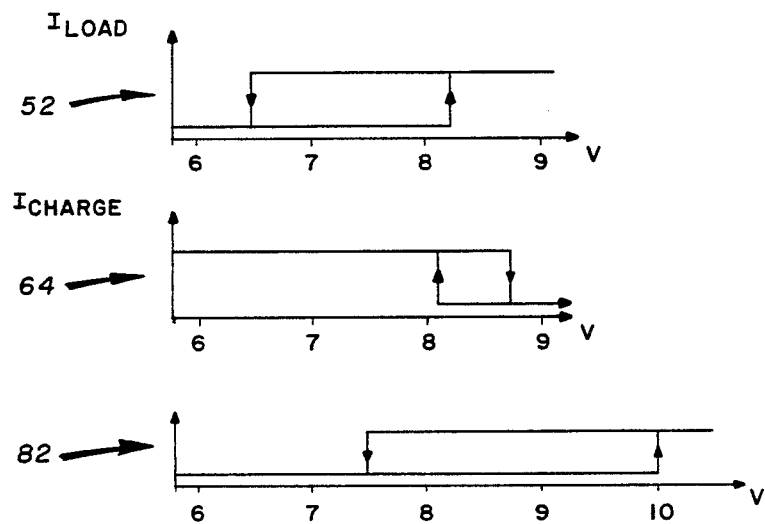
FIG. 3 contains a family of hysteresis curves which illustrate the functioning of the load control means, the charge rate control means, and the protection means.

FIG. 3 includes a hysteresis diagram 64 showing the functioning of the charge rate control means. When the battery is fully charged (e.g., when battery voltage is 8.5 volts) the current limiting diode is switched into the charging circuit to limit the charging current. When, the battery voltage falls to the lower hysteresis level of 8.2 volts, the current limiting diodes are switched out of the charging circuit and the battery can be charged at the full current rate supplied by the solar array.

The power supply control and protection means 12 also a protection means to prevent continuous transmission. Service ARGOS requires the transmitter to be turned "OFF" for 15 minutes any time the transmitter continuously transmits for more than 1 second. The continuous transmission protection means 38 (see FIG. 2) includes: an Under Over Voltage Detector (UOVD) 66; a RC timing circuit 68; a voltage bridge 70, 2 HEXFET switches 72, 74; and, a discharge resistor 76. Unit 2 of UOVD 66 is used to sense when the integration of Vcc2 (through the RC timing circuit 68) has continued for more than 1 second. The inventors sense the length of time voltage Vcc has been applied to the VCO, since without the VCO operating the 401 MHz signal cannot be generated. However, alternatively the voltage to the power amp (Vcc1), the loop amplifier (Vcc3) or the TCX0 (Vcc4) could be tested.

When the voltage to the VCO is continuously on for 1 second, unit 2 of UOVD 66 is turned "ON", which causes output 78 to go high. When output line 78 goes high, HEXFET switch 72 is pulsed "ON" and grounds the input to UOVD 40, which in turn switches the encoder 14 off. When encoder 14 is turned off, voltage to the transmitting components is terminated. Similarly, when output 78 goes high, a positive step voltage goes to SET 1 of UOVD 66 and causes output line 80 to close HEXFET switch 74. When HEXFET switch 74 closes, the battery 50 is drained at a rate determined by resistor 76. The discharge rate in the preferred embodiment is set to 40 milliamps, which is much higher than the maximum possible charge rate from the solar array. The discharge will continue until the battery voltage drops below 7.5 volts which is very close to a depleted battery. When the battery voltage reaches 7.5 volts, unit 2 of UOVD 66 is turned off, HEXFET switch 74 is switched off, the discharge stops, and if the solar array is still receiving light, charging of the battery resumes and the battery voltage begins to increase. However, the transmitting system will not be turned on by the load control means 45, until the battery voltage has again reached the 8.2 volt level. This battery discharge and recharge cycle has a duration of at least 15 minutes, thus meeting Service ARGOS requirements.

FIG. 3 is a hysteresis diagram 82 illustrating the functioning of the continuous transmission protection means. The higher threshold is reached after the protection means detects continuous operation of the VCO for more than 1 second. Once the protection means is triggered, the battery voltage is discharge through discharge resistor 76 and its voltage drops. When the battery voltage reaches the lower hysteresis level of 7.5 volts, the protection means discontinues the discharge operation and allows the battery to be charged by the solar array.

Figure 5:
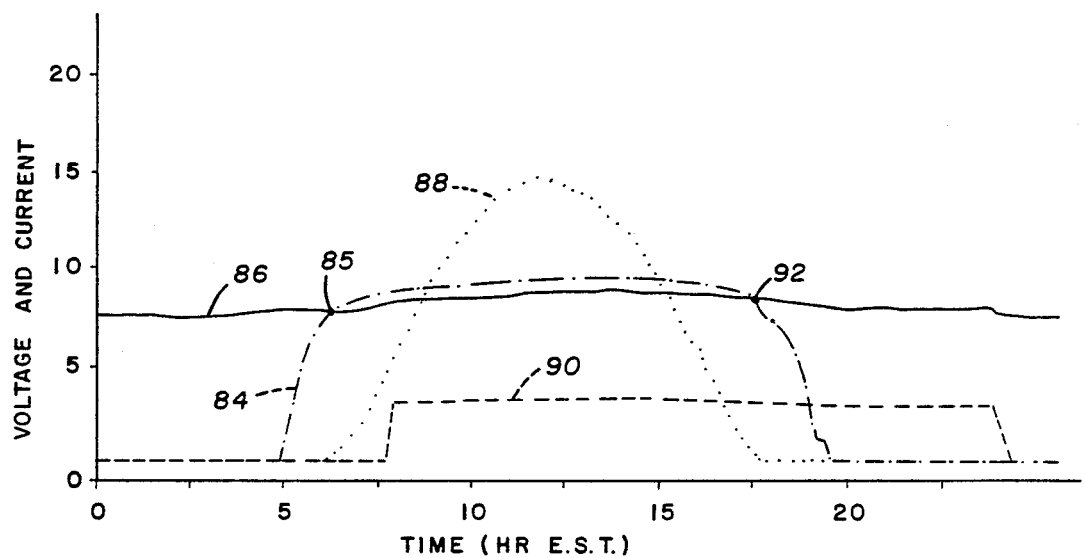
FIG. 5 illustrates the charge and load behavior of the invented ARGOS PTT under the control of the load control means and charge rate control means.
Figure 6:
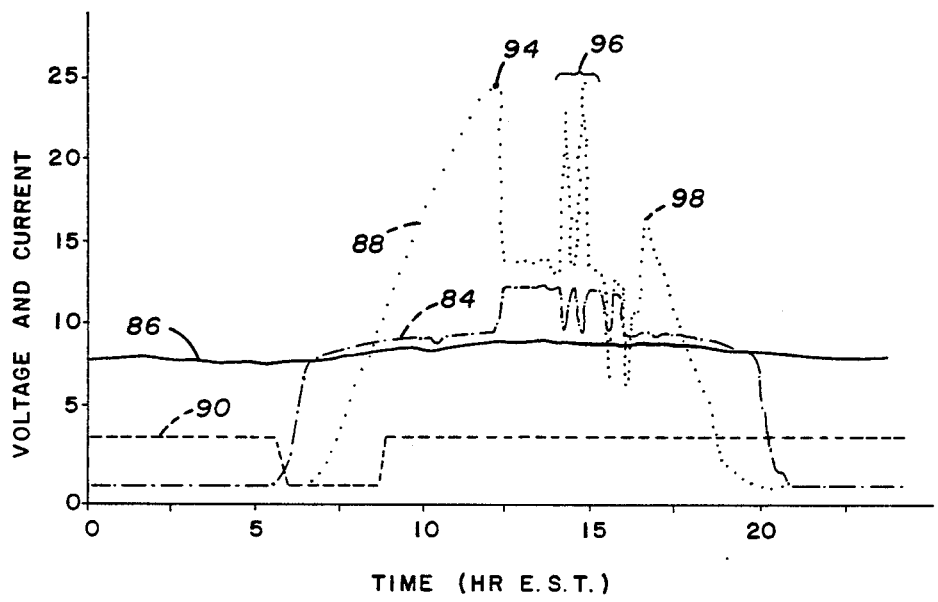
FIG. 6 is a charge and load diagram with best depicts the operation of the charge rate control means as taught by the present invention.

FIGS. 5 and 6 show the charge and load behavior of the invented ARGOS transmitter under the control of the load control means and charge rate control means. The graph shows how the overall solar array/battery system provides adequate load current to the transmitter means. The horizontal axis of the graph in FIG. 5, illustrates the charge and load behavior for an average clear day. During the early hours of the day, the transmitter load has been disconnected by the load control means, and the only current drain is the small current required by the power supply control circuit to monitor battery voltage. When the sun rises about 5 a.m., the solar array voltage, shown by line 84, starts to increase. At point 85, the solar array voltage (line 84) exceeds the battery voltage (line 86) and the solar array current (line 88) begins to flow into the battery and battery charging commences. As the battery is charged, the battery voltage (line 86) slowly rises. When the battery voltage reaches a level of 8.5 volts, the load control means turns on the transmitter means and current flows from the battery and solar array into the transmitter circuit (line 90 represents the load current). At point 92 the sun has begun to set and the solar array voltage (line 84) drops below the battery voltage (line 86) and the battery begins to discharge. At this point the transmitter circuit is draining current and slowly depleting the battery. When the battery voltage drops to 6.5 volt, the load control means disconnects the transmitter means. The transmitter has been powered continuously for 16 hours and is now turned off until the battery is again charged to the appropriate charge level (25 to 30% of the battery charge capacity). As mentioned previously, the purpose of the load control means is to assure that the transmitter is not turned on until sufficient charge is stored in the battery to power the transmitter for at least two continuous hours.

FIG. 6 is a charge and load diagram which best depicts the operation of the charge rate control means. Line 84 represents the solar array voltage, line 86 represents the battery voltage, line 88 represents the solar array current being fed into the battery, and line 90 represents the load current. Focusing attention to point 94 on a graph, we see that the battery voltage reaches a level 8.5 volt indicating that the battery is fully charged. To protect the battery, the charge rate control means switches a current limiting diode into a circuit which causes the solar array current (line 88) to drop (at point 94). It will be noted that at several points throughout the day (points 96), the power supplied by the solar cell array drops, probably due to a cloud occluding the sun). During these periods the battery voltage can drop to the lower hysteresis level of 8.2 volts and the charge rate control means will disconnect the current limiting diode and allow the battery to charge at the full solar array current. At point 98 the sun has begun to set, and the transmitter has discharged the battery so that the voltage falls below the lower hysteresis level of 8.2 volts. At this point the charge rate control means again switches the current limiting diode out of the charging circuit and allows the solar array to charge the battery at its full current capacity. It will be noted that the charge rate control means can switch the charging rate several times during the day as a function of sun intensity and battery drain. This will in no way effect or disturb current supplied to the transmitter circuit. However, as noted previously, the load control means should not be switching the transmitting circuit off and on frequently, but assure that the transmitter is turned on for at least 2-hour periods The graph of FIG. 6 was taken from measurements made during mid August at 39 degrees north latitude and it will be noted that the solar array/battery power supply, under the control of the power supply control and protection means, provided sufficient current to power the transmitter circuit for a continuous period of 22 hours.

Various other modifications, adaptations and alternative designs are, of course, possible in light of the above teachings. Therefore, it should be understood at this time that within the scope of the appended claims the invention may be practiced otherwise than specifically described herein.

What is claimed is:

1. A portable transmitter for transmitting information to an earth satellite, comprising:
    a rechargeable battery;
    a solar array operably connected to said battery for charging said rechargeable battery;
    a transmitter means for sending information to a satellite; and,
    a load control means operably connected to said rechargeable battery and said transmitter means, for operably actuating said transmitter means when the voltage level of said rechargeable battery reaches a first threshold level and for deactivating said transmitter means when the voltage level of said rechargeable battery subsequently falls to a second lower threshold level, wherein said load control means further includes a controller means, for sequentially applying power to components of said transmitter means during each transmission cycle that said transmitter means is actuated.

2. A portable transmitter for transmitting information to an earth satellite, comprising:
    a rechargeable battery;
    a solar array operably connected to said battery for charging said rechargeable battery;
    a transmitter means for sending information to a satellite; and,
    a load control means operably connected to said rechargeable battery and said transmiter means, for operably actuating said transmitter means when the voltage level of said rechargeable battery reaches a first threshold level and for deactivating said transmitter means when the voltage level of said rechargeable battery subsequently falls to a second lower threshold level, wherein said load control means further includes a charge rate control means, operably connected to said solar array and said rechargeable battery, for switching a current limiting means in series with said solar array when the voltage level of said rechargeable battery reaches a first threshold level and for switching out said current limiting means when the voltage lelvel of said rechargeable battery subsequently falls to a second lower threshold level.

3. The apparatus of claim 2, wherein said first threshold level associated with said charge rate control means is set to a voltage level indicating full charge of said rechargeable battery.

4. A portable transmitter for transmitting information to an earth satellite, comprising:
    a rechargeable battery;
    a solar array connected to said battery for charging said rechargeable battery;
    a transmitter means for sending information to a satellite; and,
    a load control means operably connected to said rechargeable battery and said transmitter means, for operably actuating said transmitter means when the voltage level of said rechargeable battery reaches a first threahold level and for deactivating said transmitter means when the voltage level of said rechargeable battery subsequently falls to a second lower threshold level, wherein said load control means further includes a protection means for switching a discharge load in series with said rechargeable battery when said transmitter means produces a continuous signal over a certain time signal in excess of a set standard, and for switching out said discharge load when the voltage level of said rechargeable battery subsequently falls below a certain threshold.

5. The apparatus of claim 4, wherein said protection means switches out said discharge load prior to depletion of said rechargeable battery.

6. The apparatus of claim 1, wherein said transmitter means includes:
    a temperature compensated crystal oscillator for generating a reference signal;
    a dividing phase lock loop means, phase locked to said reference signal, for generating a desired carrier signal;
    a power amplifier means operably connected to said dividing phase lock loop means for amplifying said desired output signal; and,
    an antenna coupled to said power amplifier for emitting said desired output signal.

7. The apparatus of claim 6, wherein said controller means first supplies power to said temperature compensated crystal oscillator, second supplies power to said dividing phase lock loop means, and then supplies power to said power amplifier means, during each transmission cycle.

8. The apparatus of claim 7, wherein said temperature compensated crystal oscillator is supplied with power at a certain time interval before said power amplifier means is actuated, said time interval set to allow said temperature compensated crystal oscillator sufficient time to warm up and stabilize.

9. The apparatus of claim 6, wherein said dividing phase lock loop means further includes:
    a voltage control oscillator operating at the carrier frequency;
    a divide circuit operably connected to said voltage control oscillator;
    a phase detection means, operably connected to said temperature compensated crystal oscillator, and said divide circuit, for generating an error signal; and,
    a loop amplifier operably connected to said phase detection means, for generating the control voltage to said voltage control oscillator.

10. The apparatus of claim 9, further including a phase modulator operably coupled to said loop amplifier, for switching offset voltages to said loop amplifier, thereby modulating said output signal.

11. The apparatus of claim 10, further including a central controller means operably coupled to said phase modulator, for switching said offset voltages, thereby transmitting sync bits, a transmitter identification code, and sensor information data.

12. A portable transmitter for transmitting information to an earth satellite, comprising:
    a rechargeable battery;

a solar array operably connected to said rechargeable battery for charging said rechargeable battery;

a transmitter means for sending information to a satellite;

a load control means operably connected to said rechargeable battery and said transmitter means, for operably actuating said transmitter means when the voltage level of said rechargeable battery reaches a first threshold level and for deactuating said transmitter means when the voltage level of said rechargeable battery subsequently falls to a lower threshold level;

a charge rate control means, operably connected to said solar array and said rechargeable battery, for switching a current limiting means in series with said solar array when the voltage level of said rechargeable battery reaches a first threshold level and for switching out said current limiting means when the voltage level of said rechargeable battery subsequently falls to a second lower threshold level; and, a protection means for switching a discharging load in series with said rechargeable battery, when said transmitter means produces a continuous signal over a certain time interval in excess of a set standard, and for switching out said discharge load when the voltage level of said rechargeable battery falls below a certain threshold level.

13. The apparatus of claim 12, wherein said transmitter means includes:

a temperature compensated crystal oscillator for generating a reference signal;

a dividing phase lock loop means, phase locked to said reference signal for generating a desired carrier signal;

a power amplifier means operably connected to said dividing phase lock loop means for amplifying said desired output signal; and, an antenna coupled to said power amplifier for emitting said output signal.

14. The apparatus of claim 13, wherein said load control means further includes a controller means, for sequentially applying power to components of said transmitter means during each transmitter transmission cycle in accordance with the following sequence: first, supply power to said temperature compensated crystal oscillator second, supply power to said dividing phase lock loop means, and then supply power to said power amplifier.

15. The apparatus of claim 14, wherein said temperature compensated crystal oscillator is supplied with power at a certain interval before said power amplifier is powered, said time interval set to allow said temperature compensated crystal oscillator sufficient time to warm up and stabilize.

* * * * *